(12) United States Patent
Shih et al.

(10) Patent No.: US 11,631,379 B2
(45) Date of Patent: Apr. 18, 2023

(54) DATA AUTHORIZATION CONTROLLING AND MATCHING SYSTEM CAPABLE OF CUSTOMIZING DATA ACCESSING AUTHORIZATION

(71) Applicants: BenQ Intelligent Technology (Shanghai) Co., Ltd, Shanghai (CN); BENQ CORPORATION, Taipei (TW)

(72) Inventors: Chia-Nan Shih, Taipei (TW); Lin-Yuan You, Taipei (TW); Chin-Fu Chiang, Taipei (TW); Chen-Chi Wu, Taipei (TW); Jung-Kun Tseng, Taipei (TW); Chuang-Wei Wu, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 161 days.

(21) Appl. No.: 17/367,650

(22) Filed: Jul. 6, 2021

(65) Prior Publication Data

US 2022/0013081 A1 Jan. 13, 2022

(30) Foreign Application Priority Data

Jul. 8, 2020 (CN) .......................... 202010651543.5

(51) Int. Cl.
*G06F 3/038* (2013.01)
*G09G 5/00* (2006.01)
*G09G 5/12* (2006.01)

(52) U.S. Cl.
CPC ............. *G09G 5/005* (2013.01); *G09G 5/001* (2013.01); *G09G 5/006* (2013.01); *G09G 5/12* (2013.01)

(58) Field of Classification Search
CPC ........ G09G 5/005; G09G 5/001; G09G 5/006; G09G 5/12
(Continued)

(56) References Cited

U.S. PATENT DOCUMENTS

2006/0200672 A1* 9/2006 Calhoon ............... H04L 9/3278
713/176
2009/0044251 A1* 2/2009 Otake ................... H04L 63/102
726/3
(Continued)

FOREIGN PATENT DOCUMENTS

| CN | 105306869 A | 2/2016 |
|---|---|---|
| TW | M536380 U | 2/2017 |
| TW | M537667 U | 3/2017 |

*Primary Examiner* — Jonathan M Blancha
(74) *Attorney, Agent, or Firm* — Winston Hsu

(57) ABSTRACT

A data authorization controlling and matching system includes a receiver, a plurality of display devices, and at least one transmitter. The receiver is used for receiving an image signal. The plurality of display devices are coupled to the receiver for displaying the image signal. The at least one transmitter is coupled to the receiver for outputting the image signal. After a member list saved in the receiver is configured, a data link between the receiver and the at least one transmitter is established. Hardware information of the at least one transmitter is saved in the receiver. The receiver automatically identifies the at least one transmitter according to the hardware information of the at least one transmitter. After the at least one transmitter is identified, the receiver sets authorization information of the at least one transmitter.

20 Claims, 5 Drawing Sheets

(58) Field of Classification Search
USPC .......................................................... 345/204
See application file for complete search history.

(56) References Cited

U.S. PATENT DOCUMENTS

2014/0040781 A1     2/2014   Epstein
2021/0337282 A1*   10/2021   Chhabra .......... H04N 21/47217

* cited by examiner

DATA AUTHORIZATION CONTROLLING AND MATCHING SYSTEM CAPABLE OF CUSTOMIZING DATA ACCESSING AUTHORIZATION

BACKGROUND OF THE INVENTION

1. Field of the Invention

The present invention illustrates a data authorization controlling and matching system, and more particularly, a data authorization controlling and matching system capable of setting data browsing and accessing authorization, and capable of matching a member list with transmitters operated by users.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify several hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operational efficiency.

Since using wireless communications technologies for reporting conference data has become an inevitable trend, the setting of browsing authorizations, the setting of data accessing authorizations, the setting of privacy authorizations, and the setting of automation function of data contents have also become important issues. For example, in a conference room having a plurality of members and a plurality of displays, data contents of the conference may be displayed on some displays and blocked by other displays. Therefore, it is an important design issue to develop a programmable and automatable mechanism and system for controlling data browsing and accessing authorizations.

SUMMARY OF THE INVENTION

In an embodiment of the present invention, a data authorization controlling and matching system is disclosed. The data authorization controlling and matching system comprises a receiver, a plurality of display devices, and at least one transmitter. The receiver is configured to receive an image signal. The plurality of display devices are coupled to the receiver and configured to display the image signal. At least one transmitter is coupled to the receiver and configured to output the image signal. After a member list saved in the receiver is configured, a data link between the receiver and the at least one transmitter is established. The receiver acquires identification data of the at least one transmitter after the data link between the receiver and the at least one transmitter is established. The receiver maps the at least one transmitter to the member list according to the identification data. The image signal is transmitted from an image signal source coupled to a transmitter of the at least one transmitter to the transmitter after the transmitter is triggered. The transmitter processes the image signal and transmits the image signal to the receiver. The receiver controls a display device for displaying an image.

In another embodiment of the present invention, a data authorization controlling and matching system is disclosed. The data authorization controlling and matching system comprises a receiver, a plurality of display devices, and at least one transmitter. The receiver is configured to receive an image signal. The plurality of display devices are coupled to the receiver and configured to display the image signal. The at least one transmitter is coupled to the receiver and configured to output the image signal. After a member list saved in the receiver is configured, a data link between the receiver and the at least one transmitter is established. Hardware information of the at least one transmitter is saved in the receiver. The receiver automatically identifies the at least one transmitter according to the hardware information of the at least one transmitter. After the at least one transmitter is identified, the receiver sets authorization information of the at least one transmitter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
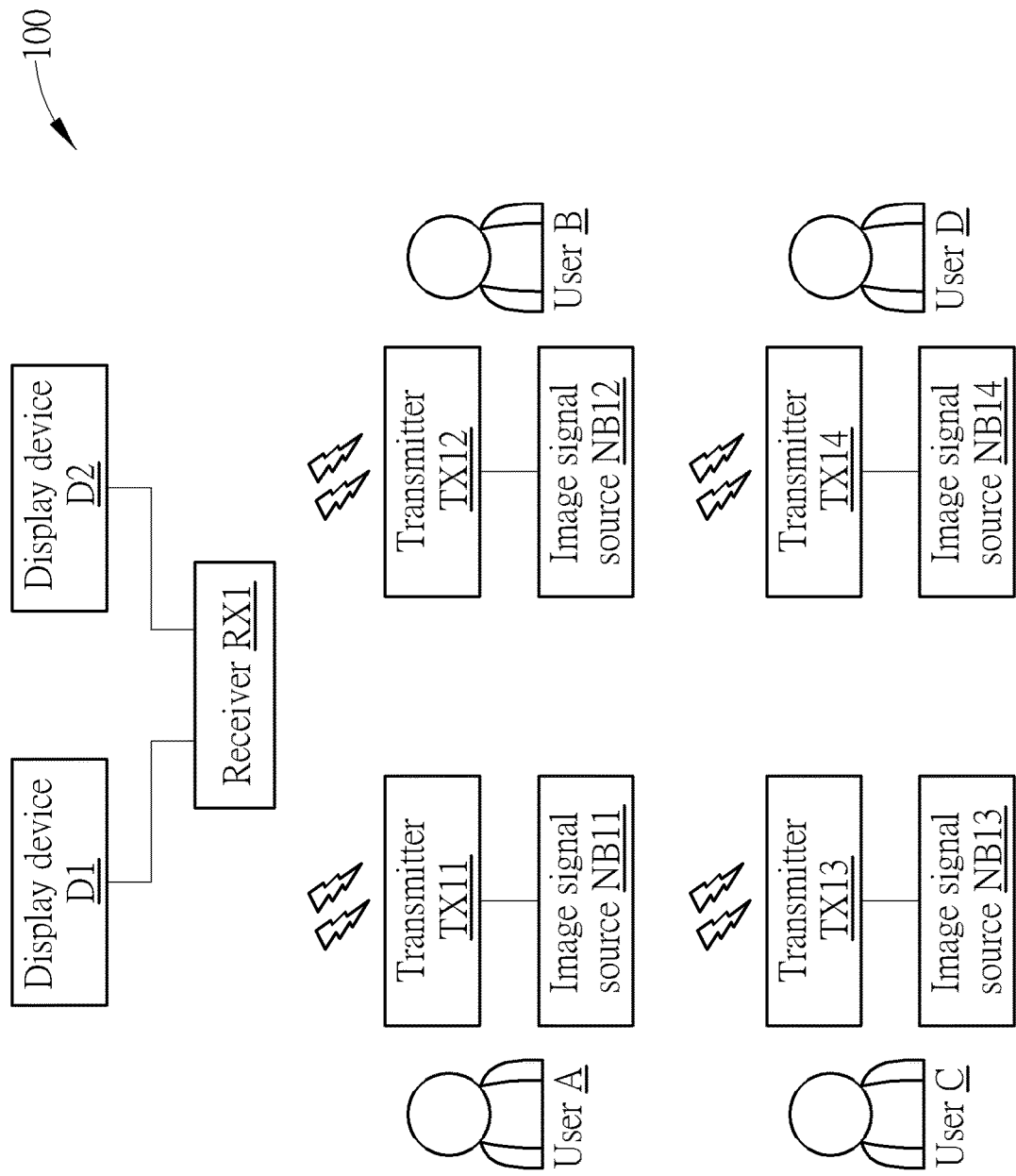
FIG. 1 is a block diagram of a data authorization controlling and matching system according to an embodiment of the present invention.

FIG. 1 is a block diagram of a data authorization controlling and matching system 100 according to an embodiment of the present invention. The data authorization controlling and matching system 100 includes a receiver RX1, a plurality of display devices D1 and D2, and at least one transmitter TX11 to TX14. Further, the number of receivers, the number of display devices, and the number of transmitters in the data authorization controlling and matching system 100 are not limited in FIG. 1. The receiver RX1 is used for receiving image signals. The plurality of display devices D1 and D2 are coupled to the receiver RX1 for displaying the image signals. At least one transmitter TX11 to TX14 is coupled to the receiver RX1 for outputting image signals. Each of the at least one transmitter TX11 to TX14 can be coupled to a corresponding image signal source. The image signal source can be any communications device capable of generating image signals, such as a notebook, a desktop computer, or a tablet. For example, the transmitter TX11 can be coupled to the image signal source NB11 and can be operated by user A. The transmitter TX12 can be coupled to the image signal source NB12 and can be operated by user B. The transmitter TX13 can be coupled to the image signal source NB13 and can be operated by user C. The transmitter TX14 can be coupled to the image signal source NB14 and can be operated by user D. Each transmitter has a button for establishing a data link to the receiver RX1 or triggering to receive the image signal generated by the image signal source. In the data authorization controlling and matching system 100, the receiver RX1 can wirelessly pair with a plurality of transmitters TX11 to TX14. Further, since the receiver RX1 is linked to the plurality of display devices D1 and D2, the receiver RX1 can also control contents displayed on the display devices D1 and D2 (or block certain displayed contents). As previously mentioned, since the receiver RX1 can be wirelessly paired with the plurality of transmitters TX11 to TX14 and the plurality of transmitters TX11 to TX14 can be operated by the corresponding users A to D, the receiver RX1 has to identify the transmitters TX11 to TX14 for controlling data authorization information of the image signal transmitted from at least one specific transmitter. Details of the identification and pairing methods of the transmitters TX11 to TX14 performed by the receiver RX1 are illustrated later.

Figure 2:
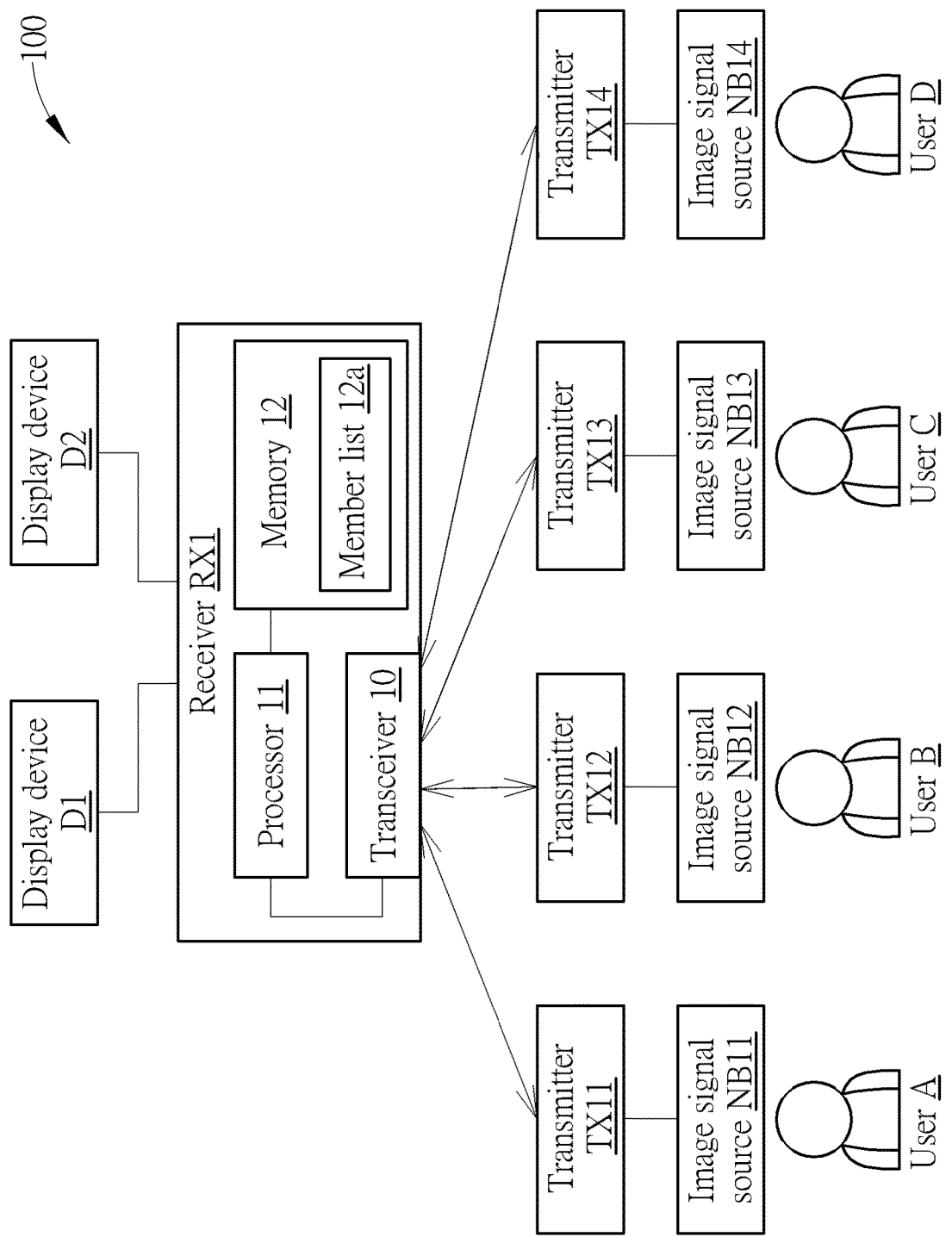
FIG. 2 is an illustration of matching a member list with transmitters operated by users of the data authorization controlling and matching system in FIG. 1.

FIG. 2 is an illustration of matching a member list 12a with transmitters TX11 to TX14 operated by users A to D of the data authorization controlling and matching system 100. As shown in FIG. 2, the receiver RX1 in the data authorization controlling and matching system 100 includes a transceiver 10, a processor 11 and a memory 12. The transceiver 10 is used for establishing a data link with the transmitters TX11 to TX14. The processor 11 is coupled to the transceiver 10 for identifying the transmitters TX11 to TX14 and processing data. The memory 12 is coupled to the processor 11. The memory 12 has a member list 12a. In the data authorization controlling and matching system 100, after the member list 12a saved in the memory is configured, data links between the receiver RX1 and the transmitters TX11 to TX14 are established. The users A to D operating the transmitters TX11 to TX14 are listed in the member list 12a. After the data links between the receiver RX1 and the transmitters TX11 to TX14 are established, the receiver RX1 can acquire identification data of the transmitters TX11 to TX14. Then, the receiver TX1 can map the transmitters TX11 to TX14 to the member list 12a according to the identification data. For example, the memory 12 in the receiver RX1 can store the member list 12a. The member list 12a can include data information of users A to D and their authorization parameters, as shown in Table T1.

TABLE T1

| user A | user B | user C | user D |
|---|---|---|---|
| authorization parameter A1 | authorization parameter B1 | authorization parameter C1 | authorization parameter D1 |
| authorization parameter A2 | authorization parameter B2 | authorization parameter C2 | authorization parameter D2 |
| . | . | . | . |
| . | . | . | . |
| . | . | . | . |
| authorization parameter AN | authorization parameter BN | authorization parameter CN | authorization parameter DN |

In Table T1, each user can set N authorization parameters. N is a positive integer. After the receiver RX1 is paired with the transmitters TX11 to TX14, when one of the transmitters TX11 to TX14 (such as the transmitter TX11) is triggered, the image signal source NB11 coupled to the transmitter TX11 can transmit the image signal to the transmitter TX11. The transmitter TX11 processes the image signal and transmits the image signal to the receiver RX1. The receiver RX1 can control the display device (i.e., depending on the authorization parameters of the image signal, such as turning on the display device D1) for displaying the image according to the image signal. In other words, a pre-step of the data authorization controlling and matching system 100 is to map the transmitters TX11 to TX14 operated by the users to the member list 12a according to the member list 12a. By doing so, the image signal source can be identified in real-time. Further, the image signal can be transmitted or blocked automatically according to the authorization parameters.

In the data authorization controlling and matching system 100, the receiver RX1 can identify the transmitters TX11 to TX14 by using various methods, as illustrated below. In a first method, the receiver RX1 can generate a request signal according to the member list 12a. The receiver RX1 can transmit the request signal to the transmitters TX11 to TX14. After the request signal is received, the transmitters TX11 to TX14 can transmit the identification data to the receiver RX1 according to the request signal. After the identification data of the transmitter TX11 to TX14 is received, the receiver RX1 can match the transmitters TX11 to TX14 with the member list 12a. Therefore, in the first method, the receiver RX1 can control the transmitters TX11 to TX14 for transmitting the identification data by using the request signal. In a second method, after data links between the receiver RX1 and the transmitters TX11 to TX14 are established, the transmitters TX11 to TX14 can automatically transmit the identification data to the receiver RX1 so that the receiver RX1 can acquire the identification data of the transmitters TX11 to TX14. After the identification data of the transmitters TX11 to TX14 is received, the receiver RX1 can match the transmitters TX11 to TX14 with the member list 12a. Further, the identification data can be generated in a form of a packet format or embedded in the image signal. For example, the identification data can be embedded in a header of the image signal. Therefore, in the second method, the transmitters TX11 to TX14 can automatically transmit the identification data to the receiver RX1. In a third method, after the member list 12a saved in the receiver RX1 is configured, the data links between the receiver RX1 and the transmitters TX11 to TX14 are established. Hardware information of the transmitters TX11 to TX14 is saved in the receiver RX1. Since the receiver RX1 has the hardware information of the transmitters TX11 to TX14, the receiver RX1 can automatically identify the transmitters TX11 to TX14. Particularly, the hardware information of the transmitters TX11 to TX14 is unique. For example, the hardware information of the transmitters TX11 to TX14 is their machine codes. The hardware information of the transmitters TX11 to TX14 can be modified by user, such as a changeable hardware key. Further, after the transmitters TX11 to TX14 are identified, the receiver RX1 can set or edit authorizations of the transmitters TX11 to TX14. Therefore, in the third method, the receiver RX1 can automatically identify the transmitters TX11 to TX14. In a fourth method, the receiver RX1 can generate the request signal (or any triggering signal) according to the member list 12a. The receiver RX1 can transmit the request signal (or any triggering signal) to the transmitters TX11 to TX14. The transmitters TX11 to TX14 can relay the request signal (or any triggering signal) to the image signal sources NB11 to NB14. After the image signal sources NB11 to NB14 receive the request signal, the image signal sources NB11 to NB14 can generate identification data to the transmitters TX11 to TX14. Therefore in the fourth method, the receiver RX1 requests the image signal sources NB11 to NB14 for transmitting the identification data through the transmitters TX11 to TX14. Further, the identification data can include hardware user names, communication software accounts, and/or email user names corresponding to the image signal sources NB11 to NB14 coupled to the transmitters TX11 to TX14. In the aforementioned four methods, the transmitters TX11 to TX14 can support single-directional data communications or bi-directional data communications. When the transmitters TX11 to TX14 only support single-directional data communications, the transmitters TX11 to TX14 require an interface for outputting image signals (High Definition Multimedia Interface, HDMI). When the transmitters TX11 to TX14 support bi-directional data communications, the transmitters TX11 to TX14 require an interface for outputting a video signal (such as the HDMI) and require a data transmission port (such as Universal Serial Bus, USB). However, any reasonable modification of the transmitters TX11 to TX14 capable of performing single-directional or bi-directional data communications falls into the scope of the present invention.

Further, in the data authorization controlling and matching system. 100, after the receiver RX1 maps the transmitters TX11 to TX14 to the member list 12a, the receiver RX1 can control a designated display of all displays D1 and D2 coupled to the receiver RX1 for displaying the image signal according to a plurality of authorization parameters. For example, a user A of the transmitter TX11 is a financial officer. An image signal generated by the image signal source NB11 is a slide sheet related to financial statements. After the image signal generated by the image signal source NB11 is transmitted to the receiver RX1 through the transmitter TX11, the receiver RX1 can selectively control a specific display device for displaying image contents generated by the image signal according to the plurality of authorization parameters. For example, the display device D1 can display an entire slide sheet related to the financial statements. The display device D2 can only display a part of the slide sheet related to the financial statements, or mask certain contents of the financial statements. In other words, the image signal generated by the image signal source NB11 can be provided for a user having the authorization of browsing full contents displayed on the display device D1, and can be partially blocked or masked for a user having the authorization of browsing a part of contents displayed on the display device D2.

Figure 3:
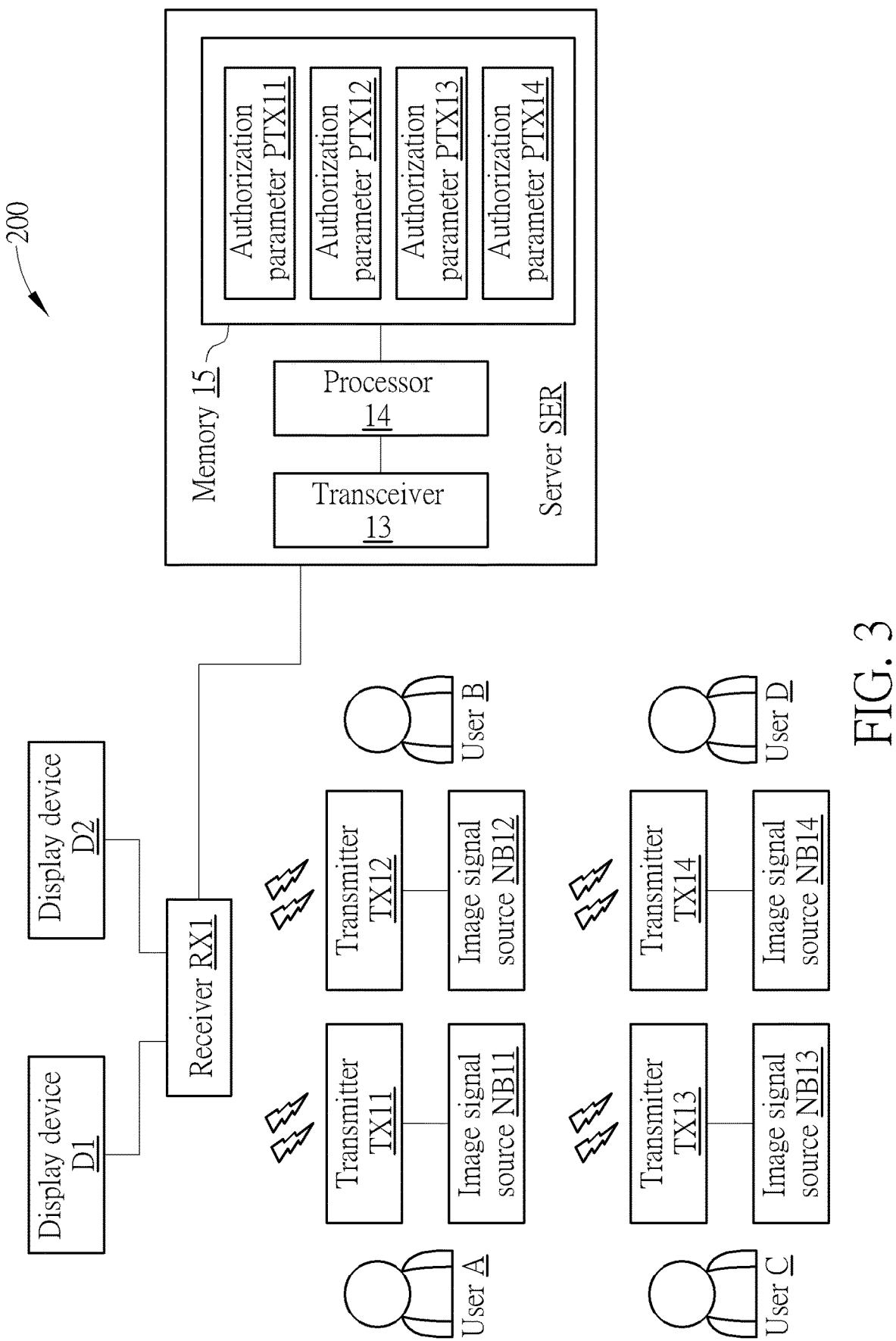
FIG. 3 is an illustration of introducing a server for setting a plurality of authorization parameters of the data authorization controlling and matching system in FIG. 1.

FIG. 3 is an illustration of introducing a server SER for setting a plurality of authorization parameters of the data authorization controlling and matching system 100. To avoid ambiguity, the data authorization controlling and matching system 100 with the server SER is defined as a data authorization controlling and matching system 200. Operations of the data authorization controlling and matching system 100 are similar to operations of the data authorization controlling and matching system 200. A difference is that the receiver RX1 of the data authorization controlling and matching system 200 can acquire authorization parameters of the member list 12a from the server SER. Details are illustrated below. The server SER can be linked to the receiver RX1 for saving the authorization parameters PTX11 to PTX14. The server SER can include a transceiver 13, a processor 14 and a memory 15. The transceiver 13 is used for establishing a data link to the receiver RX1. The memory 15 saves authorization parameters of users A to D. For example, the user A can operate the transmitter TX11 and the image signal source NB11. A corresponding authorization parameter is denoted as PTX11. The user B can operate the transmitter TX12 and the image signal source NB12. A corresponding authorization parameter is denoted as PTX12. The user C can operate the transmitter TX13 and the image signal source NB13. A corresponding authorization parameter is denoted as PTX13. The user D can operate the transmitter TX14 and the image signal source NB14. A corresponding authorization parameter is denoted as PTX14. After the receiver RX1 establishes a data link to the server SER, the authorization parameters PTX11 to PTX14 can be acquired. In other words, in the data authorization controlling and matching system 200, the receiver RX1 can match the transmitters TX11 to TX14 with the member list 12a in the receiver RX1 according to the identification data of the transmitters TX11 to TX14. Then, the receiver RX1 can acquire the authorization parameters PTX11 to PTX14 saved in the server SER. Therefore, when at least one of the transmitters TX11 to TX14 is triggered, the image signal transmitted from the at least one of the transmitters TX11 to TX14 to the receiver RX1 can be categorized and displayed on the designated display device according to the authorization parameters PTX11 to PTX14.

Figure 4:
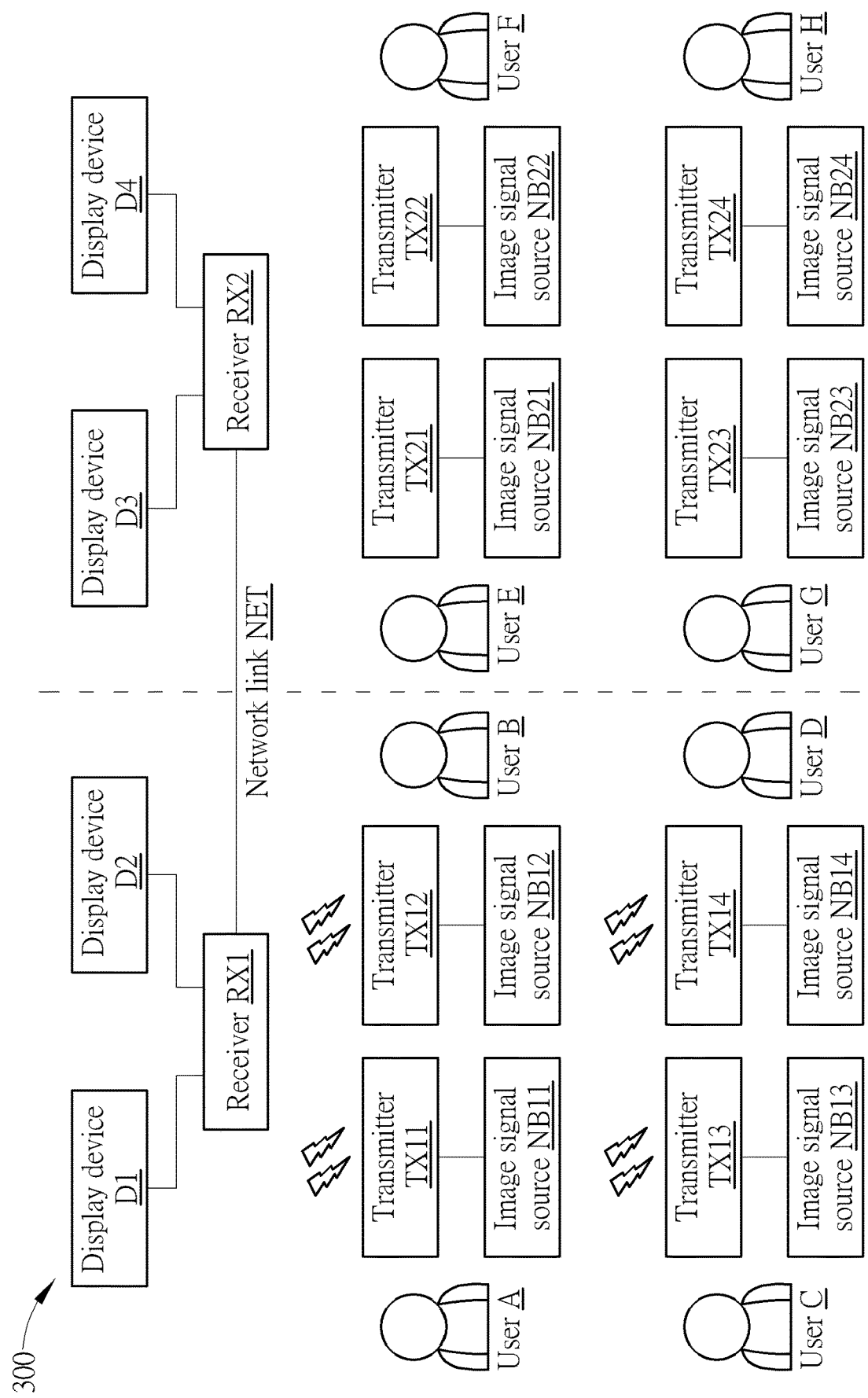
FIG. 4 is an illustration of introducing receivers, a plurality of display devices, a plurality of transmitters, and a plurality of image signal sources disposed in different meeting rooms of the data authorization controlling and matching system in FIG. 1.

FIG. 4 is an illustration of introducing receivers RX1 and RX2, a plurality of display devices D1 to D4, a plurality of transmitters TX11 to TX24, and a plurality of image signal sources NB11 to NB24 disposed in different meeting rooms of the data authorization controlling and matching system 100. As shown in FIG. 4, the authorization control and matching system 100 can be integrated with additional hardware for supporting more users. In order to avoid ambiguity, the authorization control and matching system 100 with additional hardware is defined as an authorization control and matching system 300 hereafter. As shown in FIG. 4, since the receiver RX1 and the receiver RX2 can establish a data link, the receiver RX1 and the receiver RX2 can be linked together through a wired network or a wireless network. After the receiver RX1 and the receiver RX2 establish a network link NET, data communications between the receiver RX1 and the receiver RX2 can be performed.

The transmitter TX21 can be coupled to the image signal source NB21, and can be operated by the user E. The transmitter TX22 can be coupled to the image signal source NB22, and can be operated by the user F. The transmitter TX23 can be coupled to the image signal source NB23, and can be operated by the user G. The transmitter TX24 can be coupled to the image signal source NB24, and can be operated by the user H. Further, the display devices D1 and D2, the receiver RX1, the transmitters TX11 to TX14, the image signal sources NB11 to NB14, and the users A to D can be located in the same meeting room. The display devices D3 and D4, the receiver RX2, the transmitters TX21 to TX24, the image signal sources NB21 to NB24, and the users E to H can be located in another meeting room. Here, the authorization parameters of the contents of the image signal can include conditions of blocking a part of displayed image and/or a part of displayed text contents of the image signal, or conditions of displaying the image signal by using at least one designated display through at least one designated transmitter. The authorization parameters can further include authorization parameters of the transmitters TX11 to TX24, authorization parameters of the receivers RX1 and RX2, and authorization parameters of contents of the image signal. For example, the image signal of the image signal source NB22 operated by user F can be transmitted to the display devices D1 and D2, and can be blocked by the display devices D3 and D4. Based on this configuration, a transmission path of the image signal generated by the image signal source NB22 can be denoted as: the image signal source NB22→the transmitter TX22→the receiver RX2→the receiver RX1→the display devices D1 and D2. In other words, the authorization parameters of the receiver RX1 can include conditions of transmitting the image signal to at least one designated display device through at least one designated receiver. Further, as shown in FIG. 4, since the receiver RX1 can establish the network link NET to another receiver RX2, after at least one transmitter (i.e., such as transmitter TX11 to transmitter TX24) is mapped to the member list 12a by the receiver RX1, the image signal can be transmitted to at least one designated display device through the receiver RX1 and/or another receiver RX2 according to the authorization parameters.

In the data authorization controlling and matching systems 100, 200, and 300, an artificial intelligence technology can be introduced. For example, after the receiver RX1 maps the transmitters TX11 to TX14 to the member list 12a, an artificial intelligence network can be used for controlling a designated display of all displays D1 and D2 coupled to the receiver RX1 for displaying the image signal. In other words, an artificial intelligence chip or an external artificial intelligence network can be regarded as a trained neural network-based structure for automatically adjusting the authorization parameters of the image signal according to the contents of the image signal. Therefore, by introducing the artificial intelligence technology, operating convenience and efficiency of the data authorization controlling and matching systems 100, 200, and 300 can be further improved.

Further, in the data authorization controlling and matching systems 100, 200, and 300, when the transmitter is coupled to the image signal source, the transmitter can be regarded as a virtual display device. For example, when the transmitter TX11 is coupled to the image signal source NB11, the transmitter TX11 can transmit extended display identification data (EDID) to a data processing device disposed inside the image signal source NB11. The data processing device in the image signal source NB11 can be a central processing unit (CPU) or a graphics card. Then, after the data processing device receives the EDID, the data processing device can identify the transmitter TX11 as the virtual display device for performing wireless commutations by providing the image signal to the transmitter TX11 according to the EDID.

Figure 5:
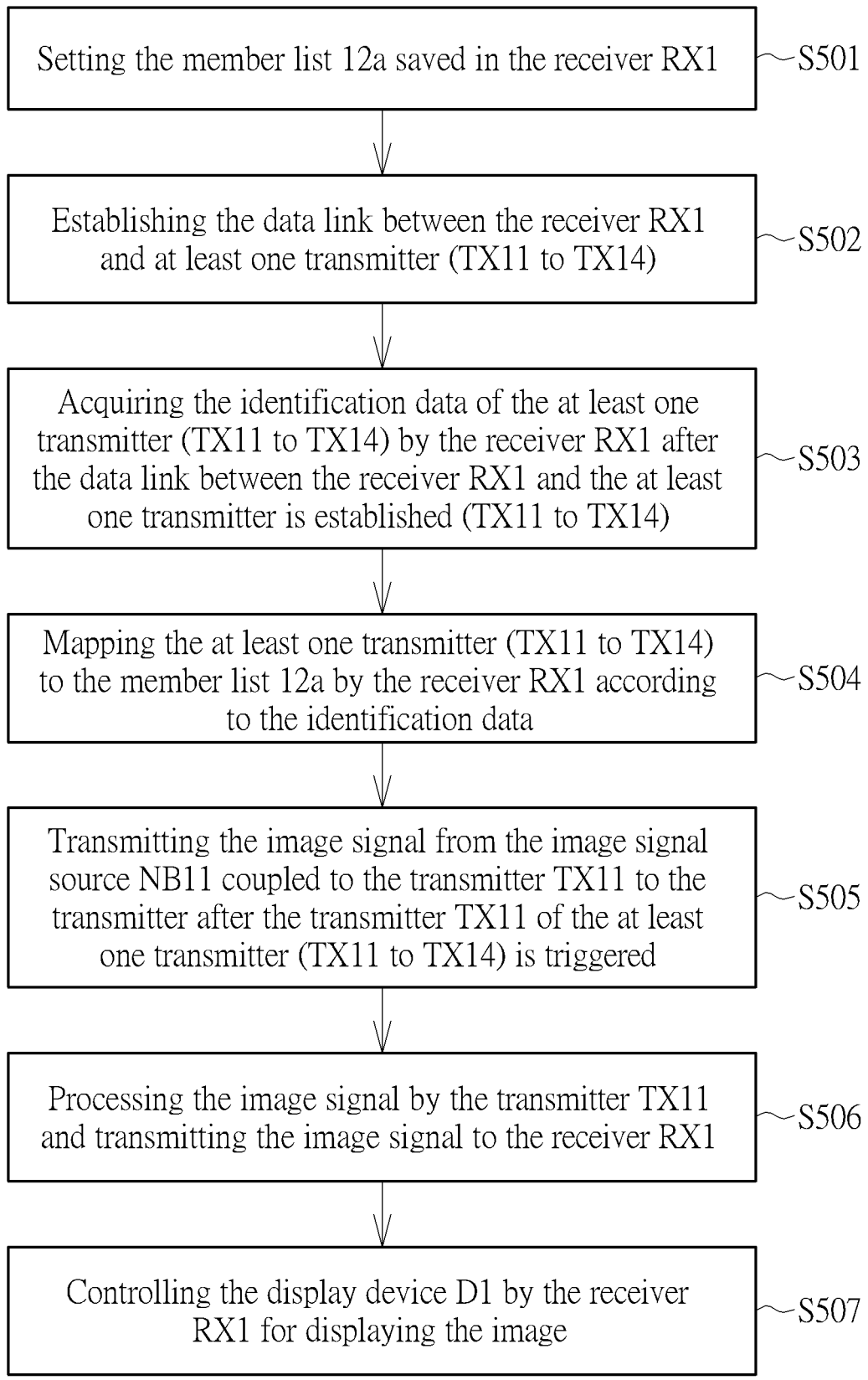
FIG. 5 is a flow chart of performing a data authorization controlling and matching method by the data authorization controlling and matching system in FIG. 1.

FIG. 5 is a flow chart of performing a data authorization controlling and matching method by the data authorization controlling and matching system 100. The data authorization controlling and matching method includes step S501 to step S507. Any reasonable technology modification falls into the scope of the present invention.

Step S501 to step S507 are illustrated below.

step S501: setting the member list 12a saved in the receiver RX1;

step S502: establishing the data link between the receiver RX1 and at least one transmitter (TX11 to TX14);

step S503: acquiring the identification data of the at least one transmitter (TX11 to TX14) by the receiver RX1 after the data link between the receiver RX1 and the at least one transmitter is established (TX11 to TX14);

step S504: mapping the at least one transmitter (TX11 to TX14) to the member list 12a by the receiver RX1 according to the identification data;

step S505: transmitting the image signal from the image signal source NB11 coupled to the transmitter TX11 to the transmitter after the transmitter TX11 of the at least one transmitter (TX11 to TX14) is triggered;

step S506: processing the image signal by the transmitter TX11 and transmitting the image signal to the receiver RX1;

step S507: controlling the display device D1 by the receiver RX1 for displaying the image.

Details of step S501 to step S507 are previously illustrated. Thus, they are omitted here. In the data authorization controlling and matching system 100, by using the aforementioned steps, the member list saved in the receiver can be matched with the transmitters and the image signal sources. After the matching process is completed, the data authorization controlling and matching system can control a transmission path of the image signal generated by the image signal source according to the predefined or dynamically adjusted authorization parameters. Then, a part of contents of the image signal can be restricted or blocked. Therefore, the data authorization controlling and matching system 100 can be regarded as a programmable and automatable authorization controlling and matching system.

To sum up, the present invention discloses a data authorization controlling and matching system. A receiver of the data authorization controlling and matching system has a member list. The receiver can automatically identify a plurality of transmitters. The transmitters can automatically transmit identification data to the receiver for identifying the transmitters by the receiver. The receiver can also transmit a request signal to the transmitters for requesting the transmitters to report the identification data. After the receiver uses the identification data for matching the member list with the transmitters, the authorization controlling and matching system can control certain monitors or display devices for displaying, restricting, or blocking image contents according to the authorization parameters. Therefore, when the authorization controlling and matching system is applied to a meeting report action, operations of a browsing authority, an access authority, and a privacy authority of meeting contents can be automatically executed. Therefore, the data authorization controlling and matching system can optimize the accessibility of data contents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data authorization controlling and matching system comprising:
   a receiver configured to receive an image signal;
   a plurality of display devices coupled to the receiver and configured to display the image signal; and at least one transmitter coupled to the receiver and configured to output the image signal;

wherein after a member list saved in the receiver is configured, a data link between the receiver and the at least one transmitter is established, the receiver acquires identification data of the at least one transmitter after the data link between the receiver and the at least one transmitter is established, the receiver maps the at least one transmitter to the member list according to the identification data, the image signal is transmitted from an image signal source coupled to a transmitter of the at least one transmitter to the transmitter after the transmitter is triggered, the transmitter processes the image signal and transmits the image signal to the receiver, and the receiver controls a display device for displaying an image.

2. The system of claim 1, wherein the receiver generates a request signal to the at least one transmitter according to the member list, and the at least one transmitter transmits the identification data to the receiver according to the request signal.

3. The system of claim 1, wherein after the data link between the receiver and the at least one transmitter is established, the at least one transmitter automatically transmits the identification data to the receiver so that the receiver acquires the identification data.

4. The system of claim 3, wherein the identification data comprises a hardware user name, a communication software account, and/or an email user name corresponding to at least one image signal source coupled to the at least one transmitter.

5. The system of claim 1, wherein at least one image signal source coupled to the at least one transmitter receives a request signal, and after the at least one image signal source receives the request signal, the at least one image signal source generates the identification data to the at least one transmitter.

6. The system of claim 1, wherein after the receiver maps the at least one transmitter to the member list, the receiver controls a designated display of all displays coupled to the receiver for displaying the image signal according to a plurality of authorization parameters, and the plurality of authorization parameters comprises authorization parameters of the at least one transmitter, authorization parameters of the receiver, and authorization parameters of contents of the image signal.

7. The system of claim 6, wherein the authorization parameters of the contents of the image signal comprises conditions of blocking a part of displayed image and/or a part of displayed text contents of the image signal, or conditions of displaying the image signal by using at least one designated display through at least one designated transmitter.

8. The system of claim 1, wherein after the receiver maps the at least one transmitter to the member list, an artificial intelligence network is used for controlling a designated display of all displays coupled to the receiver for displaying the image signal.

9. The system of claim 1, wherein after a data link between the receiver and another receiver is established and the receiver maps the at least one transmitter to the member list, a designated display is controlled by the receiver and/or another receiver for displaying the image signal according to a plurality of authorization parameters.

10. The system of claim 1, wherein when the transmitter is coupled to the image signal source, the transmitter transmits an extended display identification data (EDID) to a data processing device disposed inside the image signal source, and after the data processing device receives the EDID, the data processing device identifies the transmitter as a virtual display device for performing wireless commutations by providing the image signal to the transmitter according to the EDID.

11. A data authorization controlling and matching system comprising:

a receiver configured to receive an image signal;

a plurality of display devices coupled to the receiver and configured to display the image signal; and at least one transmitter coupled to the receiver and configured to output the image signal;

wherein after a member list saved in the receiver is configured, a data link between the receiver and the at least one transmitter is established, hardware information of the at least one transmitter is saved in the receiver, and the receiver automatically identifies the at least one transmitter according to the hardware information of the at least one transmitter, and after the at least one transmitter is identified, the receiver sets authorization information of the at least one transmitter.

12. The system of claim 11, wherein the hardware information of the at least one transmitter is unique.

13. The system of claim 11, wherein the hardware information of the at least one transmitter is a machine code or a changeable hardware key.

14. The system of claim 11, wherein the receiver controls a designated display of all displays coupled to the receiver for displaying the image signal according to a plurality of authorization parameters, and the plurality of authorization parameters comprises authorization parameters of the at least one transmitter, authorization parameters of the receiver, and authorization parameters of contents of the image signal.

15. The system of claim 14, wherein the authorization parameters of the contents of the image signal comprises conditions of blocking a part of displayed image and/or a part of displayed text contents of the image signal, or conditions of displaying the image signal by using at least one designated display through at least one designated transmitter.

16. The system of claim 14, wherein the authorization parameters are predefined or dynamically adjusted for controlling a transmission path of the image signal.

17. The system of claim 11, wherein after the receiver maps the at least one transmitter to the member list, an artificial intelligence network is used for controlling a designated display of all displays coupled to the receiver for displaying the image signal.

18. The system of claim 11, wherein after a data link between the receiver and another receiver is established and the receiver maps the at least one transmitter to the member list, a designated display is controlled by the receiver and/or another receiver for displaying the image signal according to a plurality of authorization parameters.

19. The system of claim. 11, wherein when a transmitter of the at least one transmitter is coupled to an image signal source, the transmitter transmits an extended display identification data (EDID) to a data processing device disposed inside the image signal source, and after the data processing device receives the EDID, the data processing device identifies the transmitter as a virtual display device for performing wireless commutations by providing the image signal to the transmitter according to the EDID.

20. The system of claim 11, wherein the at least one transmitter has an interface and/or a data transmission port for outputting media data.

\* \* \* \* \*